(No Model.)
J. VOM HOFE.
FISHING REEL.
No. 330,811. Patented Nov. 17, 1885.
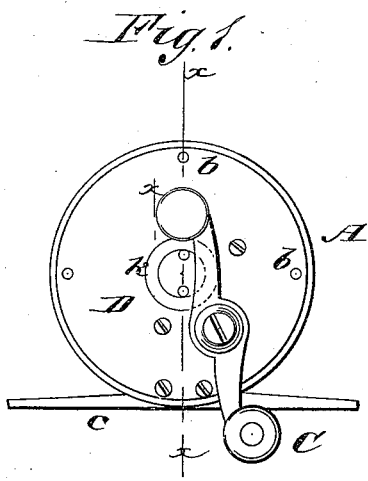
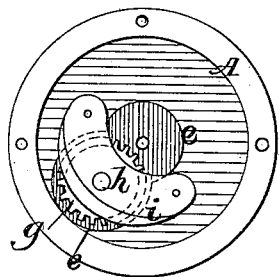
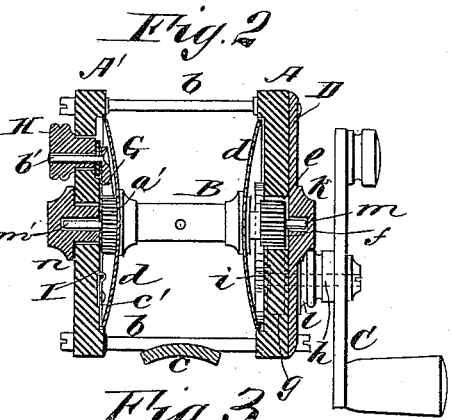
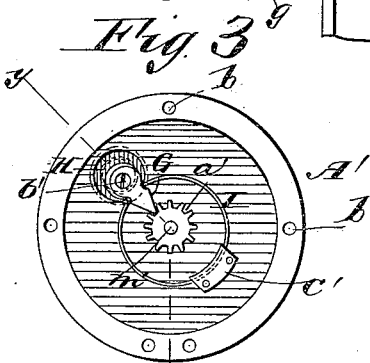
WITNESSES:
F. McArdle
C. Sedgwick
INVENTOR:
J. Vom Hofe
BY Munn & Co.
ATTORNEYS.

UNITED STATES PATENT OFFICE.

JULIUS VOM HOFE, OF BROOKLYN, NEW YORK.

FISHING-REEL.

SPECIFICATION forming part of Letters Patent No. 330,811, dated November 17 1885.

Application filed August 28, 1885. Serial No. 175,567. (No model.)

*To all whom it may concern:*

Be it known that I, JULIUS VOM HOFE, of Brooklyn, in the county of Kings and State of New York, have invented certain new and useful Improvements in Fishing-Reels, of which the following is a full, clear, and exact description.

This invention consists in a novel construction of the head of the frame of the reel, which holds the gearing used to rotate the spool of the reel. Said head, instead of being made of metal, as heretofore, consisting of a dished outer plate and disk-like inner plate, carrying the gearing in between them, is composed of a hard-rubber or other like flange or disk recessed to receive the gearing within it, and a metal outer plate constructed to form bearings or sockets for the spindles of the gearing. This forms both a cheaper, lighter, and more desirable construction generally.

The invention also consists in a peculiar attachment of the click which is usually applied to the reel, and is made capable of adjustment, so as either to engage with a wheel on the spool of the reel and indicate by its noise when the spool is being rotated, or to be disengaged therefrom and so permit of the spool being freely rotated and without noise.

In my improvement an eccentric capable of operation from the exterior is used to put the click in or out of gear, and a cut spring arranged to bear on opposite sides of the click employed to control the click in both directions of the rotation of the spool, substantially as hereinafter shown and described.

The head of the reel-frame, which carries the click mechanism, it is also proposed to make of hard rubber or other like material.

Reference is to be had to the accompanying drawings, forming part of this specification, in which similar letters of reference indicate corresponding parts in all the figures.

Figure 1 represents an exterior view of a fishing-reel embodying my invention as seen from its crank or handle end. Fig. 2 is an irregular longitudinal section taken, respectively, on the irregular lines $xx$ and $yy$ in Figs. 1 and 3, the line $xx$ indicating the course of the section on the right-hand side of Fig. 2, and the line $yy$ the course of the section on the left-hand side thereof. Fig. 3 is an inner face view of the one head of the frame with its click attachment. Fig. 4 is an inner face view of the other head of the frame with its inclosed gears.

A A' indicate the two heads of the reel-frame, connected by the usual tie-rods, $bb$, and $c$ the foot-piece or support by which the reel is carried on the rod of the angler. B is the spool of the reel, consisting of a rotating barrel with attached heads $dd$, as usual. The heads A A' are made solid of hard rubber, and the head A is recessed or apertured, as at $e$, to receive within it the ordinary gears, $fg$, by which the spool is rotated in either direction through the crank or handle C, applied to the protruding end of the arbor of the wheel $g$, which arbor may be tubular and be fitted to turn on a fixed stud, $h$, carried by a fixed plate, $i$, on the inside of the head. Upon the outer face of this head A is secured a metal plate, D, having bosses $kl$, in one, $k$, of which the spool of the reel, by an end arbor or journal, $m$, on it, is free to turn, while the arbor or journal of the wheel $g$ turns within or through the other boss, $l$.

The arbor or journal of the wheel $g$ is made tubular, as usual, and as hereinbefore described, and the plate or bridge $i$, carrying the stud $h$, upon which it turns, is secured to the inside of the rubber portion of the head A by screws $jj$, entered from the outside through the plate D and passing through the rubber into the plate or bridge $i$, thus firmly securing the bridge to its place and providing for its ready detachment when required. A metal bushing, $n$, in the other head, A', serves to support the spool or end arbor, $m'$, thereof at its other end. This construction gives a steady end support to the spool outside of its gearing, and in this respect, as well in making a strong and light structure of the whole device, the plate D performs an important function. Thus it not only provides outside bearings for the gearing, but it stiffens and supports the rubber head A, the solid construction of which, and in fact of both heads, A A', gives great strength without adding materially to weight, and in case of a fall or blow there is not the same liability to derange the working parts as when the head or heads are simply hollow metal shells.

The click mechanism is arranged as usual upon the opposite end of the reel to that occupied by the mechanism which rotates the spool, and the click, as heretofore, is made adjustable, so as to engage with or disengage from the wheel $a'$ on the spool, accordingly as it is required to throw a resistance on the rotating spool and indicate by the noise of the click that the spool is in motion, or to provide for the free rotation of the spool without the noise of the click. The mechanism, however, for thus controlling the click is different, and is constructed as follows: G is the double-acting click, which is barb-shaped on its engaging end, and has an approximately-radial motion in or out relatively to the wheel $a'$ with which it engages. To work said click in or out, for the purpose of engaging it with the wheel $a'$ or disengaging it therefrom, as required, it is pivoted eccentrically, as by a pin, $b'$, to a button, H, which is fitted to turn in the head A and is rotatable from the exterior of said head. The spring I, which controls said click, is a divided circular one, secured as at $c'$, and pressing by its cut ends on opposite sides of the click and in rear of its barbed end when the click is engaged with the wheel $a'$. Said spring thus serves to guide or control the click as it is drawn in or out of the wheel $a'$ by the turning of the button H to the right or to the left, as well as to hold the click when engaged, and to secure the necessary resistance to the click in both directions of the spool's rotation.

Having thus described my invention, I claim as new and desire to secure by Letters Patent—

1. In a fishing-reel, the combination of the solid rubber head A, apertured, as at $e$, to receive the operating-gears of the reel within it, the outer metal plate, D, having bosses $k$ $l$, constructed to form outside bearings for the spool and its operating-gears, and the bridge $i$, secured on the inner face of the rubber head A, substantially as specified.

2. In a fishing-reel, the combination, with the wheel $a'$ on the spool thereof, of the double-acting click G, the rotatable button H in the head of the frame of the reel, the eccentric pin or pivot $b'$, connecting said click with the button, and the spring I, constructed and arranged to press on opposite sides of the click, essentially as shown and described.

JULIUS VOM HOFE.

Witnesses:
 JOHN VEGER,
 JACOB GOERING.